United States Patent [19]

Leonard

[11] Patent Number: 4,872,195
[45] Date of Patent: Oct. 3, 1989

[54] REMOTE CONTROL UNIT FOR RADIO/TELEVISION TRANSMITTER STATION

[75] Inventor: John E. Leonard, San Jose, Calif.

[73] Assignee: Gentner Electronics Corporation, Salt Lake City, Utah

[21] Appl. No.: 930,783

[22] Filed: Nov. 13, 1986

[51] Int. Cl.⁴ .......................................... H04M 11/00
[52] U.S. Cl. ...................................... 379/40; 379/41; 379/104; 379/105
[58] Field of Search ................................... 379/39–42, 379/51, 102, 104–106; 455/92

[56] References Cited

U.S. PATENT DOCUMENTS

| | | | |
|---|---|---|---|
| 3,820,074 | 6/1974 | Toman | 379/104 X |
| 4,095,050 | 6/1978 | Beachem et al. | 379/104 |
| 4,371,751 | 2/1983 | Hilligoss, Jr. et al. | 379/51 X |
| 4,493,947 | 1/1985 | Loveless | 379/51 X |
| 4,558,181 | 12/1985 | Blanchard et al. | 379/42 X |
| 4,748,654 | 5/1988 | Gray | 379/40 |

OTHER PUBLICATIONS

Page Tek, Inc., Raleigh, N.C., Brochure, "New Grom Page Tek... Protect Remote Transmitter Sites! Protek Means Less Down-Time & Fewer Service Calls; You Get Full Remote Control..." Copy Received by PTO on 12/7/87.
Page Tek, Inc., Raleigh, N.C., Brochure, "Pro Tek Automatic Remote Site Protector, Tecnical Description", Copy Received by PTO 12/7/87.
Butler National, Corp., Lenexa, Kans., "ADAS II" Operation-Maintenance Manual, Revision O, Sep. 1982; Copy in 379/51.
Capital Controls Company, Inc., Colmar, Pa., "Advance Series 1520", Instruction Manual, Bulletin B3 81520 3, Pub. No. 385-2, Mar. 1985.

Primary Examiner—Keith E. George
Attorney, Agent, or Firm—Thorpe, North & Western

[57] ABSTRACT

A device and method for remote control of a radio or television transmitting station located separate from a control studio and being capable of (i) monitoring preset conditions, (ii) activating notification channels for communication of monitored conditions (iii) responding to commands given remote from the device for initiating remedial or other appropriate actions. The method and device involve use of a microprocessor for locating at the transmitter station and for providing a plurality of input and output ports, means for storing preset conditions and comparing such conditions with status and metering data received at the input ports, and including a memory bank for storing separate action signals for initiating corrective action and for developing stored coded voice signals useful as part of voice synthesis. Alarm notification is provided by voice synthesized and transmitted over telephone lines which enable contact with the remote control device over any public telephone. The device includes a command response section which is responsive to signals generated at the telephone receiver to control corrective action or further diagnostic work utilizing the remote device under the control of an operator via remote telephone.

13 Claims, 2 Drawing Sheets

REMOTE CONTROL UNIT FOR RADIO/TELEVISION TRANSMITTER STATION

BACKGROUND OF THE INVENTION

1. Field of Invention

The present invention relates to a microprocessor-based remote control unit which operates on a dial-up telephone network. More particularly, the present invention pertains to a remote control unit which provides verbal communication to a remote site regarding status of certain monitored conditions and parameters, with capability for corrective action being initiated by remote control.

2. Prior Art

The typical configuration of a broadcast operation for radio or television includes a studio here programming is conducted and certain control circuitry operated and a transmitter which is usually remote from the studio and positioned at a preferable location for good transmission of the radio or television signal. By establishing a remote control link from the studio to the transmitter, broadcast expenses may be reduced by eliminating on-site personnel from the transmitter site. Existing broadcast transmitter remote control systems have previously consisted of a transmitter unit and a studio unit. These have been located at their respective studio and transmitter locations and have been interconnected with a dedicated circuit such as a telephone line having continuous and exclusive application to the interconnected remote control units. Sensors and other testing devices are connected at inputs of the transmitter remote control unit and provide real time measurement of operational parameters such as plate voltage, operating temperatures, current levels, power consumption, reflected power measurements, standby power, filament status, status of auxiliary operating systems, tower lights, etc. In addition, environmental conditions are monitored such as unlawful intrusion, open doors or windows, temperature, flooding or excessive water conditions, structural integrity of building and pertinent structures, and other environmental matters of interest.

The use of a dedicated telephone line constitutes a substantial expense, particularly in view of optional methods of utilizing existing telephone lines for periodic intermittant monitoring or transmission of operational parameters at the transmitter location. For example, it is well known that an existing telephone line provides an appropriate interconnective circuit from a monitoring device located at a particular facility and a remote telephone receiver which can be utilized to access data detected and/or stored in the monitoring device. The following U.S. patents illustrate various applications of monitoring systems which interconnect via conventional telephone lines:

U.S. Pat. No. 4,438,295 Hales
U.S. Pat. No. 4,353,502 Myers
U.S. Pat. No. 4,332,980 Reynolds, et al.
U.S. Pat. No. 4,493,948 Sues, et al.
U.S. Pat. No. 4,442,320 James, et al.
U.S. Pat. No. 4,493,947 Loveless The first five patents disclose remote systems for activating heating or cooling of a building, for monitoring its temperature or for otherwise providing remote detection of breach of security, burglary, fire or other emergency conditions. Typically, the occurrence of such a condition automatically activates a telephone dialing sequence which dials a pre-program med and number and transmits a code or alarm signal. The Hales patent permits the remote listener to call the building location over a remote phone, allowing the phone to ring a predetermined number of times to thereupon automatically activate a furnace or air conditioner system. The Loveless patent discloses a monitoring systems which also includes a device identifier transmission and use of a microphone to detect sounds at the environment of the monitoring device and to transmit those sounds to the telephone user.

Although such basic devices are useful in monitoring existence of emergency conditions such as burglary, fire and environmental conditions such as temperature, the complexity of monitoring and regulating a remote transmitter station for radio or television broadcasting poses additional complexities which have discouraged efforts to use non-dedicated telephone lines and over-simplified systems. It is apparent that an unmanned transmitter station broadcasting radio or television signals over great distances must be subject to immediate control, problem detection and access for immediate correction to prevent a serious condition of interference, as well as loss of transmission services with resultant economic effects. For these reasons, the Federal Communications Commission has regulated remote control of transmitter stations for many years. Improved equipment and practice has recently permitted easing of some aspects of remote control. For example, the point of remote control no longer needs to be the studio or at some other location which is registered and on file with the Commission. It is now permissible to activate remote control from any location. Such deregulation develops even greater incentive for development of a remote control system capable of operating over nondedicated telephone interconnecting circuits. Specifically, new regulations allow accessing the remote control unit at the transmitter location via any telephone connection, including locations unassociated with the broadcasting studio. Nevertheless, such remote control operation still mandates appropriate security and application of sound engineering practice which protects the public welfare, as well as providing competent operation of the broadcast system.

What is needed, is a remote control system which retains critical capabilities for recording data and out-of-tolerance conditions, alarm reporting, accurate metering of operational parameters, and fully secured access control, as well as providing such features over an open, public switched telephone network. Even more significant is the ability to meet such stringent remote operation requirements within a "user-friendly" system which can be operated by nontechnical personnel in accordance with simple procedures.

OBJECTS AND SUMMARY OF THE INVENTION

It is therefore an object of the present invention to provide a remote control system for use with an unmanned transmitting station wherein the interconnecting medium comprises a normal or switched telephone network.

It is a further object of the present invention to provide such a remote control system which includes real-time operating and measurements procedures in a medium of understandable communication.

A still further object of the present invention is to provide such a remote control system wherein the transmitter unit detects operating parameters and other status conditions and communicates with a remote party by verbal communication.

Yet another object of the present invention is to provide a remote control unit which gives verbal identification of condition and contingencies and provides a responsive channel to receive command signals which activate corrective measures at the transmitter location through the remote control unit.

A further object of the present invention is to provide a remote control unit which is capable of automatically responding with corrective action upon detection of certain contingencies, while at the same time activating notification procedures to a remote location to enable monitoring of the correction action, or to enable further corrective action to be initiated from the remote station.

Another object of this invention is to provide a system which realizes all of the previous objectives within a single device which may be coupled to any telephone existing within the public telephone network, thereby giving access to the remote control device from any telephone anywhere in the world.

These and other objects are realized in a remote control device for use at a radio or television transmitting location which is separate from a control studio. This device is capable of (i) monitoring preset conditions, (ii) activating notification channels for communication of monitored conditions and (iii) responding to commands given remote from the device for initiating remedial or other corrective actions. The device comprises a microprocessor to be located at the transmitter station. The processor includes a plurality of input ports and output ports and means for storing a plurality of preset conditions to be measured. Comparative circuitry is provided for evaluating real time measurements of operational parameters and status conditions with respect to the preset conditions, and for developing a responsive, corresponding signal with respect thereto. A bank of separate action signals is provided which includes means for generating and sending an action signal in response to detection of the responsive signal. Means are also provided for storing coded voice signals which are transmitted through a voice synthesizing mechanism coupled to the microprocessor. This structure enables the microprocessor to generate voice descriptions of monitored conditions, alarms or status reports for transmission through a telephone calling mechanism which is coupled to the microprocessor and which may be automatically activated to communicate to a third party at a distant telephone. A telephone calling means is coupled to the microprocessor and includes memory for storage of telephone numbers to be automatically dialed upon command by the microprocessor. An answer detection circuit is coupled to the microprocessor for sensing when the dial telephone number has been answered and provides for means to transmit and identification of the telephone call as originating with the transmitting station microprocessor. Finally, a command response means is coupled to the microprocessor and is responsive to signals generated at the telephone receiver to activate action signals by the microprocessor for transmittance to one of the output ports thereof. Such action signals enable a remote party to receive notification of the occurrence of a preset condition via public telephone system and to immediately respond with selection of a command which is transmitted from the remote telephone to the microprocessor. Such a command would correspond with preset action codes within the microprocessor which would be activated to effect remedial or corrective action.

The device may be adapted to monitor both digital and analog signals and can be programmed to automatically give notification and take corrective action upon occurrence of certain conditions or detection of values beyond certain limiting ranges. Corrective action may be on a preprogrammed momentary or latching basis. Inclusion of a clock mechanism enables permanent recording of date and time of detected contingencies, as well as activation of certain action codes at prescheduled times. Also disclosed is the comparable inventive method which utilizes the structural elements set forth in this invention.

Other objects and features of the present invention will be apparent to those skilled in the art, based upon the following detailed description, taken in combination with the accompanying drawings.

DETAILED DESCRIPTION OF THE INVENTION

Figure 1:
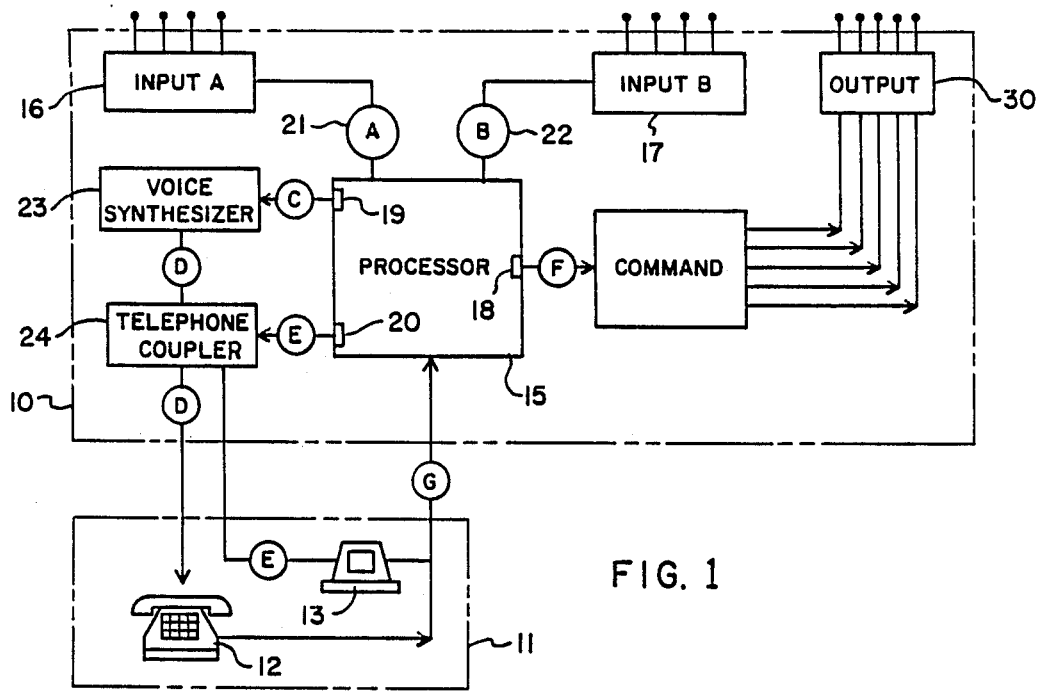
FIG. 1 is a general block diagram showing functional operation lines of the present inventive system and method.

FIG. 1 discloses in general block diagram format the generic structural features which make up the subject invention. Rectangular perimeter 10 encloses the remote control device of the present invention. This may be housed in a single, rack mountable chassis as is currently being marketed by Gentner RF Products Division, Gentner Engineering Company, Inc. of San Jose, Calif., or it may be assembled in component form. This device 10 would be located at the radio or television transmitting station whose location is separate and remote from a control studio or other location where personnel are available to monitor transmitter station operating conditions. Rectangle 11 encloses a telephone or computer terminal which would be located at this remote location, such as the control studio. Alternately, the telephone may be any telephone which provides access into the public telephone system to which the remote control device 10 is coupled. The block components of FIG. 1 are linked by alphabetic operation lines A through G. These lines represent different functional signals which perform the operations of (i) monitoring preset conditions at the transmitter location, (ii) activating notification channels through a telephone coupling to the remote telephone 12 or computer terminal 13, and (iii) responding to commands given from the telephone 12 or computer 13 with modem for initiating remedial or other appropriate action. The functional operation in general terms is set forth as follows.

The invention includes a microprocessor 15 which forms the operational controls of the invention and is located at the transmitter station. Appropriate microprocessing units include an MC146805E2 supplied by Motorola, Inc. This unit includes a time-of-day clock for clock control functions as are described hereafter. It utilizes nonvolatile CMOS Random Access Memory and has internal power supplied by a lithium battery. A plurality of input ports 16 and 17 enable transmission of data from monitoring sensors positioned at appropriate locations within equipment and environment of the transmitter station. A plurality of output ports 18, 19 and 20 enable the microprocessor to transmit data or send commands to other locations. The microprocessor memory provides means for storing a plurality of preset conditions such as voltage levels, current levels, power output-failure, power overload, security conditions, as well as fire and other safety or emergency conditions. These conditions are monitored by sensors located at points and locations being measured and are transmitted to the microprocessor 15 as analog or digital signals through input ports A and B. For illustration purposes, input A represents digital signals which typically indicate on/off conditions. Input B represents analog data which permits metering of voltage and current levels, temperature, and other parameters where scaled measurement of variable data levels is necessary. Accordingly, transmitted signals represented by circled A and B, 21 and 22, are digital and analog signals being received at the microprocessor 15.

Data signals A and B are compared with preset conditions which are stored in the memory of the microprocessor 15. A responsive signal is generated in accordance with logic commands and represents a statement of result with respect to the data comparison. In other words, if digital data received through input A matches the preset condition against which it is checked, a responsive signal may be generated. If the input data was zero voltage at the transmitter plate, and the preset condition corresponded to a zero value, the responsive signal may constitute an alarm generating signal. Similarly, if an input signal through port B was outside a preset range of limiting values constituting normal operating values as the preset condition, the responsive signal may be an alarm.

The microprocessor includes a memory bank of separate action signals for each of these preset conditions or corresponding responsive signals generated by the data comparison. Several action signals may be automatically triggered by the occurrence of the responsive alarm signal. For example, if a plate voltage equal to zero was detected, it may trigger an automatic action signal causing an auxiliary power supply to function or to apply other circuit correction to raise the voltage level. A second action signal based on the same responsive signal may activate an immediate notification function to call a preset telephone number and alert the receiving party regarding the zero plate voltage condition. It will be apparent to those skilled in the art that action signals are unlimited and may be preprogrammed to deal with anticipated contingencies, as well as to give notification of their existence. Such action signals are generated and transmitted under the control of the microprocessor to one or more output ports 18, 19 or 20. Here again, the number of output ports is unlimited and will depend upon the nature of application or function for the particular action signal.

A particularly important feature of the present invention is the use of synthesized voice signals to provide direct notification to the remote telephone 12. Such voice signals can, in fact, constitute action signals whose generation is directed to a voice synthesizer through output port 19 and across line C. For example, the action signal may generate verbal expression equivalent to "PLATE VOLTAGE ZERO", which language is generated by the voice synthesizer 23 and transmitted through the telephone coupler 24. Virtually any alarm or contingency description may be precoded within the microprocessor memory and generated in response to action signals which require transmission of the voice sounds to the remote telephone 12. The verbal signal is identified as a circled D, which is detected in the receiver of telephone 12 as a voice communication which describes the specific condition prompting the notification. Similarly, a separate action signal can instigate telephone calling means 24 (also identified as the telephone coupling or interconnect circuit) which generates an automatic dialing sequence of a preset telephone number contained either in the telephone coupling or in the memory of the microprocessor. Preferably, several telephone numbers may be stored for sequential dialing until a response is received A short time delay is allowed between the dialing of each telephone number to permit incoming calls to be received or to allow other logic operations to be performed within the microprocessor. The microprocessor includes answer detection means within its circuitry for identifying an acknowledgment of the telephone call at the remote telephone 12. Upon detection of the answer, an identification signal is generated which provides verbal notification that the call is being transmitted from the microprocessor at the transmitting station. At this point, the remote control device may await entry of a security access code preliminary to opening communications with the remote party at telephone 12, or it may simply terminate the telephone call and await a responsive telephone call from the remote operator.

In either case, the remote control device includes command response means which are coupled to the microprocessor and are responsive to signals generated by the operator at the remote telephone receiver. These commands or signals are represented by the circled G and are interpreted by the microprocessor in accordance with preprogramming to activate action signals. Such action signals would be transmitted through output port 18 and would allow the remote party to correct or change operating conditions at the transmitter by initiating commands for corrective action. Such corrective action may be a signal to increase voltage, to shut down certain circuitry or to active other circuitry, to initiate other failsafe controls or test circuitry. This may be accomplished by the operator upon receiving the notification of specific contingency (such as zero plate voltage) by verbal articulation, and then by answering number or letter codes through the number pad on the telephone. The microprocessor receives and interprets the coded response which would have been preprogrammed in the device to instigate the desired responsive action. The operator may select any combination of numbers which have been preprogrammed in the unit to activate action signals in accordance with predetermined contingency plans. Accordingly, the device enables the remote party to receive notification via remote telephone 12 and to immediately respond with a selection of an appropriate command through the numeral pad corresponding to the action desired at the transmitter site. The microprocessor reads the action code and initiates the required response. Appropriate action commands are generated as signals represented by the circled F, which result in responsive output signals 30. Such output signals 30 may range from a command increasing voltage applied at the transmitter plate to total shutdown of the transmitter system. Any action which can be programmable within a computer could be affected by the remote operator by means of the command response linkup between the remote telephone 12 and the microprocessor 15.

In summary a general method of operating the device, represented by block diagram functional elements set forth in FIG. 1, consists of the steps of:

(a) Storing a plurality of preset operational or environmental limiting conditions in a memory portion of the microprocessor. For example, a real-time current measurement may be taken at a power supply output for the transmitter on a continuous basis. This current measurement would be an on/off status measurement received through digital input port A. Accordingly, preset operational conditions would include the value of "1" representing detection of current and "0" identifying the absence of current flow.

(b) Periodically monitoring and transmitting real-time operational and environmental conditions of the transmitter at input ports of the microprocessor to ascertain real-time values. A remote operator may call in on telephone 12 and request a reading of the power supply current. These measured values would be received at input ports A. For example, a detected signal showing absence of current may be received.

(c) Comparing monitored real-time values received at the input ports with the preset limiting conditions and developing a responsive, corresponding signal with respect to such comparisons. In other words, the detected absence of current would be compared with the preset limiting condition of "0" developing a responsive signal of an alarm condition.

(d) Storing action signals within the microprocessor for use with responsive signals. In this case, the responsive signal constitutes an alarm condition which would automatically trigger one or more action signals as desired. For example, one action signal may constitute activation of an auxiliary power supply. A second action signal may instigate telephone communcation with the remote operator, a third action signal may generate a voice description of the emergency "Zero current at power supply".

(e) Generating and sending at least one of the action signals to an output port in response to detection of the responsive signal. In the present example, all three action signals would be transmitted to appropriate output ports to initiate notification and corrective action.

(f) Storing coded voice signals with the microprocessor for identification of specific words and phrases. The specific coded word phrases "ZERO CURRENT AT POWER SUPPLY" would be generated by preset coded voice signals stored within the microprocessor. This is done when the operator identifies his preset conditions and assigns specific words and phrases to each condition upon initializing the remote control system at the transmitter location.

(g) Assigning a unique coded voice signal to a corresponding action signal to enable automatic development of a voice response as part of notification at the receiving telephone following generation of one of the action signals. If the action signal constituted the numerals 093 to be generated upon occurrence of the "no current condition" at the power source, a corresponding action signal would be assigned which would generate the desired coded voice signal "zero current at power source".

(h) Coupling telephone calling means to an output of the microprocessor to generate an automatic dialing sequence for dialing at least one preset telephone number in response to detection of at least one of the action signals. This relates to the second action signal of step D which activates the telephone notification process. Upon occurrence of the zero current condition, this action signal would immediately initiate contact with the operator at remote telephone 12.

(i) Coupling an answer detection means to the miroprocessor for sensing when a dialed telephone number has been answered at a telephone receiver. When the direct current path across the tip and ring lines of the telephone system fall below 1,000 ohms or some other preset value, the telephone acknowledges the incoming call. The microprocessor then detects this answer and proceeds to the next step.

(j) Coupling identification means responsive to the answer detection means for transmitting to the answer telephone an identification of the call as originating with the transmitting station microprocessor.

(k) Coupling voice synthesizing means to the microprocessor for transmitting preselected verbal words and phrases to the telephone receiver based on detection of specific coded voice signals. Here, the voice signals would have been preprogrammed to generate verbal words "zero current at power supply" upon detection of that contingency.

(l) coupling command response means to the microprocessor to generate signals response to signals generated by the telephone receiver to activate action signals by the microprocessor for transmittance to one of the output ports. This command response means allows the operator to tap in a numerical code through the number pad on the telephone to initiate action at the microprocessor. For example, the operator may tap in 713, knowing that this code will generate an activation of an auxiliary power unit by the microprocessor.

It will be apparent to one skilled in the art that the foregoing generalized method of practice is merely illustrative, and could be restructured in a variety of orders of steps, as well as changing applications of each of the respective steps. A better understanding of this method and the apparatus will be developed based on more detailed description of a preferred embodiment as follows.

Figure 2:
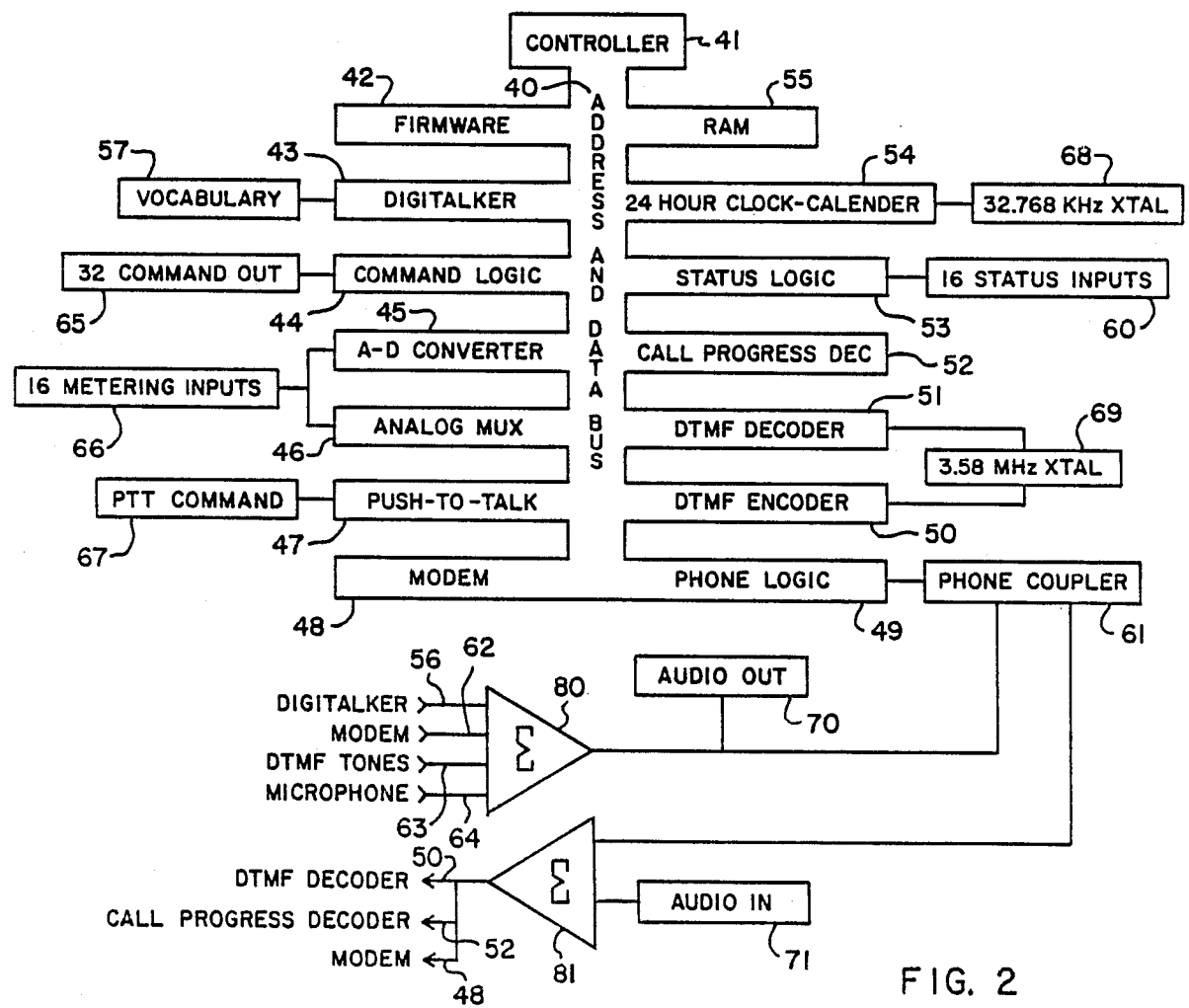
FIG. 2 is a more specific functional block diagram of the subject invention.

FIG. 2 illustrates a system block diagram showing the bidirectional I/O lines during processor operation. In this preferred embodiment, the address/data bus ties these respective processing lines together, with the controller 41. This controller 41 makes decisions according to the data present on the bidirectional lines 42 through 55.

The controller 41 or central processing unit is a MC146805 chip, chosen because of its versatility and its capacity to easily access random access memory locations. It also includes full external and timer interrupts and utilizes low power. It includes 8K of memory, but is able to support additional ROM/RAM to allow for addressing of the digitalker 56 word library. This word library is utilized to give verbal commands over the telephone describing the alert conditions previously discussed.

The microprocessor master clock 54 runs on a 4 MHz crystal oscillator, but cooperates with a MC146818 clock which generates an interrup service routine every 1/256 second. At this point, the microprocessor checks its interrupt request line to screen for data input. If an interrupt is pending, the processor will then service that routine by branching to the appropriate firmware loop 42. The preferred system includes 8 hardware interrupt circuits which are prioritized and decoded by a 74HC541 tri-state input port. These interrupts are illustrated below in sequential priority:

| PRIORITY | DESCRIPTION |
| --- | --- |
| First | Real-time clock (MC146818) |
| Second | Modem |
| Third | Interrupt A |
| Fourth | Interrupt B |
| Fifth | DTMF decoder 51(SSI202) |
| Sixth | Call progress decoder 52 (NE5900) |
| Seventh | Ring detect/loop sense (MCA11G1) |
| Eighth | Speech interrupt (MM54104) |

The subject invention includes an automatic telephone coupler 61. This operates by rectifying ringing voltage to a logic level and by monitoring loop current. The unit will detect an inbound call when the AC ringing voltage appears across tip and ring of the line telephone jack. A bridge rectifier smooth the ringing pulse at the input of an MCA11G1 opto-isolator which in turn triggers the processor ring detect/loop sense interrupt by driving its output to a low level. The unit will then answer the line when the programmed number of telephone rings has occurred. This number may be selected by the user. Once this line is terminated or has been answered subsequent to the detect/loop sense interrupt, loop current flows and continues to hold the output of the opto-isolator at the low level. By monitoring this logic level, the processor can tell when the line has been dropped or disconnected. The preferred embodiment employs a PREM SPT-183 coil as a hybrid coupler. The microprocessor controls relays of the coil to provide connection of the telephone line, thereby giving energy to the "set" jack in the set up mode. This disclosed embodiment can be set up to dial from 0 to 5 numbers when reporting an alarm. If 0 is selected, the unit will simply not dial. The telephone numbers are always dialed in sequence in accordance with the preset priority. Each dialed sequence is separated by a 60 second pause to allow incoming calls to interrupt the outbound calling procedure. After the last of the sequenced numbers is dialed, the unit may be programmed for a longer pause (i.e. 10 minutes) before redialing the first number and repeating the sequential search for a responsive telephone.

The preferred embodiment utilizes BNC connectors located on the rear of the chassis (represented by numeral 10 of FIG. 1). These connectors are active at the same time as the "line" modular jack of the telephone. The connector labeled audio in 71 is paralleled with the receive audio and the BNC marked audio out 70 contains the send audio These BNC connectors have the following characteristics:

Audio in 10,000 ohms −9 dBm nominal level
Audio out 600 ohms −9 dBm nominal level Both of these signals are unbalanced. System set up and utilization of these parameters are well within the skill of the ordinary technician and need not be further detailed herein.

The preferred embodiment incorporates 16 status inputs 60 as part of the operating system. These inputs are designed to accept either a TTL level or a dry contact closure. The input to the status lines is a DC-37P (male plug) which provides up to 37 pins, including 16 pins set aside for specific status channels. As previously indicated, these status inputs 60 operate as input ports 16 (FIG. 1) and provide detection of on/off conditions for identifying the occurrence or nonoccurrence of a predetermined contingency. Each of the 16 channels making up the status inputs 60 may be assigned to a specific sensor which identifies the on or off condition of the item being monitored. As with the previous example, one of these channels may be assigned to monitor current level from the power source. 74HCT541 Octal line drivers are used to output the status data received at the status inputs 60 onto the address/data bus.

Figure 3:
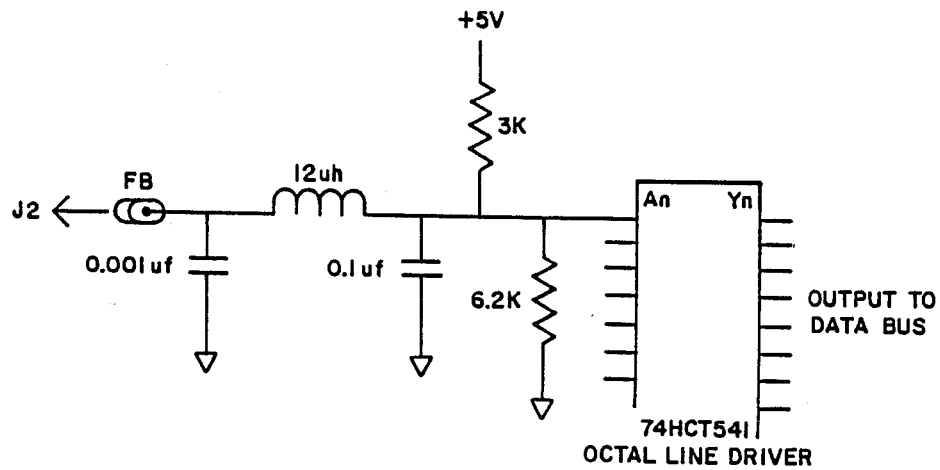
FIG. 3 is a representative schematic circuit drawing for an input port for status signals.

The operating input levels of the Octal line drivers are 0 to 0.8 VDC for a logic equal to "0" or off and +2 to +5 VDC as a logic "1" or on. The absolute operating range of this device is −0.2 to +5.2 VDC. The condition of these status ports are monitored once a second and are programmed for a logic transition to last for at least one second to insure correct detection. A typical status circuit utilized in the present device is schematically illustrated in FIG. 3. J2 represents the DC-37P plug with the 16 monitored channels.

As has been previously discussed, an alarm signal at any of these inputs may be programmed to automatically trigger corrective action by initiating an action signal preprogrammed within the processor to make appropriate adjustments through output channels. Again, the phone logic 49 may be utilized to automatically dial the preset numbers for verbal description of the alarm by means of the digitalker.

There are also 16 metering channels 66 included within the present system. Each channel is programmable to measure −5 VDC through +5 VDC or 0 VDC to +10 VDC, or the units metering inputs can be internally jumped to read −5 to +5 mA or 0 to +10 mA for full scale. Each channel has programmable tolerance limits which may be preset to define limiting conditions for automatic activation of an alarm or notification. The preferred system includes two upper limits and two lower limits. Each of these limits may have preset action signals which are triggered to provide notification and/or take other remedial action upon their occurrence.

These metering inputs are represented as input B in FIG. 1 and item 66 in FIG. 2. 16 metering input channels are provided, as with the status input channels, and are received in the chassis by means of a dB-37 connector. These channels read on an analog basis and can measure linear, power-to-linear, or calculate indirect power. When measuring a linear potential the resultant from the A/D conversion is given. With the power-to-linear conversion, a metering channel input voltage will undergo a numeric conversion from that of an exponential factor of a power meter to a linear presentation. The indirect power conversion takes the two previous, lower in channel number values, and multiplies them together to produce a numeric presentation. For example, an indirect power conversion for channel 10 may take the lower channels of 6 and 7, multiply their values together and produce the higher channel, indirect power conversion. This is similar to the power output of a transmitter being manually calculated by multiplying plate voltage by plate current.

Figure 5:
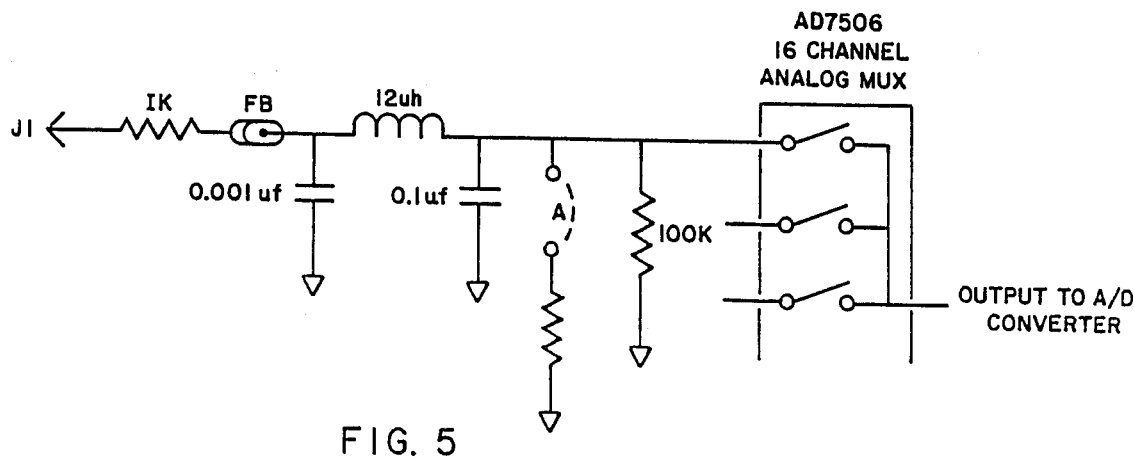
FIG. 5 is a schematic representation of circuitry for receiving metering input signals at the microprocessor.

An AD7506 multiplexer is used as a switching network for the metering channel inputs. The output of this multiplexer contains the analog representation of the input selected via four address lines. The analog to digital conversion is done by a converter AD573 on a binary weighted scale. Each of the 10 binary bits (1024) is compared with the input until the closest value is found. The AD573 has a High Byte Enable (HBE) and a Low Byte Enable (LBE) which allow the processor to read 10 bits of data for each channel instead of the normal 8. As with the status channels, the processor stores the data of all metering inputs in memory for quick processing and easy access. A typical metering circuit is shown in FIG. 5.

Figure 4:
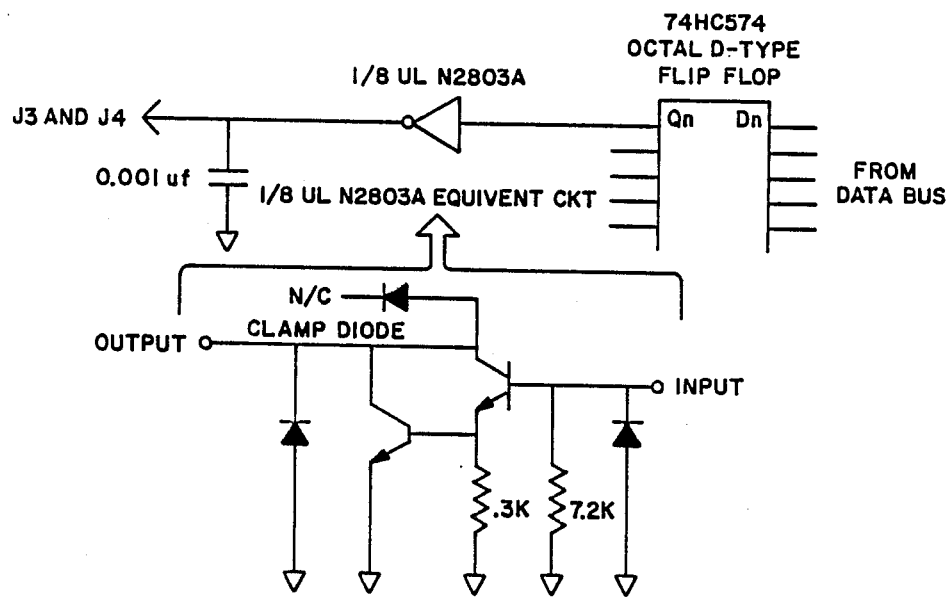
FIG. 4 is a schematic representation of circuitry for issuing command output signals from the microprocessor.

As was previously mentioned, the subject device has the capability of receiving a command from the remote telephone receiver 12 and executing the command through one or more command outputs 30. These commands are stored as 32 preprogrammed outputs configured in 16 channels of two commands each. Each of these outputs is an open collector driver and is rated to 48 VDC at 250 mA. Each of these contacts can be preprogrammed to be a latching or a momentary command, depending upon the interests of the user. An example of a momentary command would be one in which the output is enabled for 250 milliseconds, whereas the latching command could be enabled for any duration of time under the manual control of the user. FIG. 4 depicts a typical command output circuit as is used in the preferred embodiment of the present invention.

The command outputs may be utilized to initiate any action which can be transmitted as an electrical signal through the output ports 30. For example, action signals can be stored as commands for raising or lowering certain conditions such as plate voltage, temperature, current levels, etc. Such commands can also include circuits which turn on or turn off specified operations. It will be apparent to one skilled in the art that a large number of control commands may be programmed to enable remote operation of the radio or television transmitter, as well as any other device requiring such remote operation.

As illustrated in FIG. 2, a 24 hour clock is used as part of the operational system to enable real-time measurements, as well as for instigating commands or other actions on a recurring, preprogrammed basis. This 24 hour clock 54 is an MC146818 time of day clock which pulses the microprocessor at a 256 Hz rate. During operations, it allows time of day functions to be performed, and when reporting an alarm, gives the operator the time and date that the alarm was detected. It is for this reason that the clock function has the highest priority in the microprocessor interrupt network previously discussed.

A DTMF encoder and decoder are utilized in the present invention to facilitate operation of the system on a toll-grade dial-up telephone network, providing the capability of both sending and receiving data using TOUCH-TONE (Registered Trademark). The specific hardware comprises an SSI202DTMF decoder and an MK5089DTMF generator. These are both controlled by the 3.58 MHz xtal Y2. The SSI202 decoder has a receive level window of 40 dB which is centered at −10 dBm. This permits both local and long distance access.

A key feature of the present invention is the us of synthesized voice reporting which enables remote operation and notification through the telephone network. The present system utilizes a Mozer MM54105 digitalker supplied by National SemiConductor. This device is a "vocorder", meaning that energy from a voice recording is broken down into bits to recreate word by word an addressable vocabulary. It utilizes 27128A EPROMs as memory devices which contain the words or vocabulary 57 which make up the system library of terminology. The commercial system of Gentner contains almost 800 words as its vocabulary relating to remote transmitter control. The action signals which identify particular words are a composite of the broken down voice bits of the digitalker.

The power supply to the preferred embodiment comprises an AC line of either 120 VAC or 240 VAC. The power supply for the 24 hour clock comprises a 3.6 VDC lithium battery which automatically operates when the AC line drops below 72 V rms.

An illustration of the subject system in operation will assist the reader in understanding the numerous benefits that can be derived by utilizing voice transmitted communications with a command response capability from the remote telephone. For example, the present system will identify the occurrence of an alarm condition through status inputs 16 or metering inputs 17. These will be identified by the microprocessor and will initiate an action signal which automatically causes the phone coupler 24 to begin ringing the sequence of preprogrammed telephone numbers. One of these numbers may be the telephone number of a radio broadcasting studio, remote from the transmitter for that radio station. Upon answering that telephone, the operator will hear a message such as follows, "Hello, this is remote controller XYZ. Please enter access code."

The use of a security access code insures that no improper control will be exercised over the remote system. The operator simply touches the sequence of numbers on the telephone which define the preselected security access code. If incorrect input is provided, the system automatically hangs up and terminates the communication. Upon receiving the correct security access code, the system now opens its command channels to permit the operator to take appropriate action by sending input numbers or letters through the telephone receiver.

Following a correct access code entry, the system responds with, "Alarm condition detected. Metering channel 3 plate voltage 2.950 kilovolts above first high limit of 2.900 kilovolts. Time was 4:30 AM Feb. 2, 1986." This alarm signal represents the detection of a plate voltage condition which moved above the first limiting high range value which was preprogrammed within the memory of the microprocessor The system will now await for a response from the operator. The response is provided by entering letters or numbers through the hand receiver of the telephone. These letters or numbers are preprogrammed action signals which comprise contingency actions which may be taken in the event of the detected alarm. In this case, the operator may decide to enter a code which will cause the system to send a command signal to raise the voltage at the transmitter plate. For example, entry of the coded action code 613 through the hand receiver of the telephone signals the processor to send an action output 30 which accomplishes the increase in voltage. This command would be noted within the memory of the processor and recorded with the date and time of the command and responding action.

The operator may then send additional commands for purposes of inquiring as to the status or value of other operating factors or he may exit the system with an exit or cancel command. For example, having received notification of the plate voltage, the operator may have inquired for detection of power output to the plate or some other parameter in order to locate the problem source. Alternatively, the operator may simply exit the remote system by entering a command to terminate the communication. He may also enter a clearing command so that the system deletes the alarm condition and again assesses the plate voltage value against the original preprogrammed limiting voltages. Such clearing action would terminate the telephone conference and place the system back in a monitoring mode.

After several minutes, the operator may wish to check the plate voltage to determine if sufficient corrective action was taken. In this instance, the operator places the telephone call and the system responds with its salutation.

The operator enters his security access code and requests a status report on the plate voltage. The system would then respond with the detected plate voltage, whereupon the operator could make a judgment as to whether further action was required.

It will be apparent to those skilled in the art that the subject invention may be applied to other systems similar to a remote transmitter location. Indeed, the voice communication system to a remote control site has many applications which make it a significant step forward in the state of the art. It is to be understood, therefore, that the illustrations and examples set forth in this disclosure should not be considered limiting with respect to the following claims.

I claim:

1. A remote control device for use at a radio or television transmission station location separate from a control studio and being capable of (i) monitoring preset conditions, (ii) activating notification channels for communication of monitored conditions and (iii) responding to commands given remote from the device for initiating remedial and other appropriate actions, said device comprising;

a microprocessor for locating at the transmitter station and having (i) a plurality of input ports (ii) a plurality of signal output ports, (iii) means for storing a plurality of preset station operating conditions in memory, (iv) means for comparing real-time data received through the input ports with preset operating conditions within the microprocessor and for developing and detecting responsive corresponding triggering signals with respect thereto, (v) means for storing a bank of separate action signals for each responsive triggering signal, (vi) means for generating and sending action signals to output ports in response to detection of responsive triggering signals, and (vii) means for storing coded voice signals for transmission to a voice synthesizing means;

RF filter means coupled to the input ports for filtering interfering RF ambient energy, said filter means being adapted to attenuate RF frequencies operable with respect to AM, FM or television signals;

voice synthesizing means coupled to the microprocessor and to a telephone coupler and being responsive (i) to generate preset voice sounds in accordance with transmitted coded voice signals received from the microprocessor and (ii) to transmit such voice sounds to the telephone coupler;

telephone calling means coupled to an output of the microprocessor and responsive to at least one of the action signals to generate an automatic dialing sequence for dialing a preset telephone number;

means for transmitting a signal generated at a remote telephone to the microprocessor;

answer detection means coupled to the microprocessor for sensing when a dialed telephone number has been answered at a remote telephone;

means responsive to the answer detection means for transmitting to the answered remote telephone a voice identification of the telephone call as originating with the transmitting station microprocessor;

command response means coupled to the microprocessor and responsive to corrective command signals and start/stop command generated at the remote telephone to activate corresponding action signals for modifying station operating conditions through output signals generated by the microprocessor for transmittance to one of the output ports thereof, thereby enabling a remote party to receive voice notification of occurrence of a preset condition via remote telephone and to immediately respond with selection of a command which corresponds to and is contained within the preset action codes of the microprocessor.

2. A device as defined in claim 1, wherein part of the input ports are dedicated to monitor status conditions on an on/off basis for detecting the occurrence or non-occurrence of a predetermined contingency and wherein the microprocessor includes a corrective action signal capable of activation through the command response means to maintain or reverse the detected contingency from a remote location.

3. A device as defined in claim 2, further comprising means to automatically activate the corrective action signal upon occurrence of the contingency and to provide automatic dialing of a preset telephone number to give a remote party voice notification of the occurrence of the contingency and corrective action signal transmitted.

4. A device as defined in claim 2 wherein the preset status conditions stored in memory include signals representing transmitter voltage levels, power failure, power overload, security conditions, fire and overheating conditions, said coded voice signals including signals for generating voice statements verbally describing the conditions of transmitter voltage levels, power failure, power overload, security conditions, fire and overheating in a telephone communication.

5. A device as defined in claim 1, further comprising input ports which include means to meter status conditions on an analog basis for detecting relative conditions with respect to a set of predetermined contingencies and wherein the microprocessor includes action signals capable of activation through the command response means to correct a detected contingency from a remote location.

6. A device as defined in claim 5, further comprising (i) means within the microprocessor for receiving a command from the remote telephone to raise or lower metered status conditions and (ii) action signals stored in the memory of the microprocessor for initiating the command to raise or lower the condition and to transmit the same to an appropriate output port for application and service of the command.

7. A device as defined in claim 1, further comprising time register means coupled to the microprocessor for generating a real time signal upon occurrence of each status or metering check at any of the input ports to thereby document the time of each such occurrence.

8. A device as defined in claim 1, further comprising security means within the microprocessor which requires entry of a correct security access code before acceptance of any command response from the telephone receiver.

9. A device as defined in claim 8, further comprising an action signal programmed within the microprocessor and accessible from the remote telephone to clear all status readings currently being tranmitted to the remote telephone to thereby initiate a new set of status measurements without influence from previous readings.

10. A device as defined in claim 1, wherein at least two of the preset conditions relate to a single parameter being monitored and correspond to respective low and high range values whose occurrence automatically activates an action signal giving voice notification through the telephone receiver to a remote third party, all intermediate parameter values being considered normal and nonactivating as to automatic notification sequences.

11. A device as defined in claim 1, wherein the telephone calling means further comprises means for automatic dialing of a sequence of predetermined telephone numbers in serial order until one of the telephone numbers is answered at remote telephone locations being dialed, each separate telephone number being followed by a time delay of at least one minute to allow an incoming telephone call over the telephone calling means.

12. A method for remote control operation of a radio or television transmitting station utilizing a remote telephone separate from a control studio and being capable of real-time control of the transmitter and environment by means of a microprocessor capable of (i) monitoring transmitter and environment conditions such as plate voltage, temperatures, emergency conditions, and general operation parameters, (ii) activating notification channels for communication of monitored conditions and (iii) responding to commands given remote from the device for initiating remedial and other appropriate corrective actions, said method comprising the following steps:

(a) storing a plurality of present operational and environmental limiting conditions in a memory portion of the microprocessor;
(b) periodically monitoring and transmitting real-time signals representing operational and environmental conditions of the transmitter at input ports of the microprocessor to ascertain real-time values;
(c) filtering out ambient TV or radio RF energy from such real-time signals at the input ports;
(d) comparing monitored real-time values received at the input ports with the preset limiting conditions and developing responsive, corresponding triggering signals with respect to such comparisons;
(e) storing action signals within the microprocessor for use with responsive triggering signals;
(f) generating and sending at least one of the action signals to an output port in response to detection of the responsive triggering signals;
(g) storing coded voice signals within the microprocessor for identification of specific words and phrases;
(h) assigning a unique coded voice signal to a corresponding action signal to enable automatic development of a voice response as part of notification at a remote telephone following generation of one of the action signals;
(i) coupling telephone calling means to an output of the microprocessor to generate an automatic dialing sequence for dialing at least one preset telephone number in response to detection of at least one of the action signals;
(j) coupling an answer detection means to the microprocessor for sensing when a dialed telephone number has been answered at a remote telephone;
(k) coupling identification means responsive to the answer detection means for transmitting to the answered telephone an identification of the telephone call as originating with the transmitting station microprocessor;
(l) coupling voice synthesizing means to the microprocessor for transmitting preselected verbal words and phrases to the telephone based on detection of specific coded voice signals; and
(m) coupling command response means to the microprocessor to generate signals responsive to signals generated by the remote telephone to activate action signals by the microprocessor for transmittance to one of the output ports thereof, thereby enabling a remote party to receive notification of occurrence of a preset condition via remote telephone and to immediately respond with selection of a command which corresponds to and is contained within the preset action codes of the microprocessor.

13. A method as defined in claim 12, further comprising the step of:
metering status conditions on an analog basis for detecting relative conditions with respect to a set of predetermined contingencies, and
activating the command response means to correct a detected contingency from a remote location.

* * * * *